United States Patent [19]

Kainaga et al.

[11] Patent Number: 4,491,912
[45] Date of Patent: Jan. 1, 1985

[54] DATA PROCESSING SYSTEM WITH IMPROVED MICROSUBROUTINE FACILITY

[75] Inventors: Masahiro Kainaga, Yokohama; Kousuke Sakoda, Hino; Hiroaki Nakanishi, Hitachi, all of Japan

[73] Assignee: Hitachi, Ltd., Tokyo, Japan

[21] Appl. No.: 358,676

[22] Filed: Mar. 16, 1982

[30] Foreign Application Priority Data

Mar. 18, 1981 [JP] Japan .................................. 56-37979

[51] Int. Cl.³ .............................................. G06F 9/22
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,131,941 | 12/1978 | Siegel et al. | 364/200 |
| 4,202,035 | 5/1980 | Lane | 364/200 |
| 4,320,453 | 3/1982 | Roberts et al. | 364/200 |
| 4,323,964 | 4/1982 | Gruner | 364/200 |
| 4,398,244 | 8/1983 | Chu et al. | 364/200 |
| 4,407,016 | 9/1983 | Bayliss et al. | 364/200 |

*Primary Examiner*—Raulfe B. Zache
*Attorney, Agent, or Firm*—Antonelli, Terry & Wands

[57] ABSTRACT

A data processing system having a first storage for storing therein microprograms; an address register for supplying an instruction address of a microprogram to be executed into said first storage; a stack unit having a stack area for storing therein a return address of the microprogram; a first control unit responsive to a microinstruction for instructing a microsubroutine call to store the return address of the microinstruction in the stack unit, and responsive to a microinstruction for instructing return from the microsubroutine to restore the return address of the microinstruction from said stack unit; a second control unit for monitoring an interrupt request; a second storage for saving therein the content of said stack unit; a status register having a field for indicating the acceptance of the interrupt request in the course of the execution of the microprogram, and a third control unit responsive to the detection of the interrupt request by the second control unit in the course of the execution of the microprogram to indicate the acceptance of the interrupt request by the status register and save the content of the stack unit in said second storage, and responsive to the presence of the indication in the status register indicating the acceptance of the interrupt request at the end of the execution of an interrupt processing program to restore the content of the second storage to said stack unit.

4 Claims, 3 Drawing Figures

DATA PROCESSING SYSTEM WITH IMPROVED MICROSUBROUTINE FACILITY

BACKGROUND OF THE INVENTION

1. Field of the Invention

The present invention relates to a microprogram controlled data processing system. More particularly, it relates to a system for facilitating an interrupt in the course of the execution of a macro instruction in a microprogram controlled data processing system having a microsubroutine facility.

2. Description of the Prior Art

In recent years as the application of firmware proceeds, a large capacity microprogram for executing a high performance macro instruction is available. In order to reduce the storage capacity of a control storage for storing the macro program, it is a common practice to use a common microprogram or microsubroutines.

On the other hand, in one application of the data processing system, it is a common practice to control the execution of a plurality of application programs by one control program to achieve an overall function. In this manner, the utilization efficiency of the data processing system is improved. In such a configuration, the control program is controlled in accordance with an interrupt which takes place internally or externally of the data processing system such that a particular application program is selected in accordance with an application program selection criterion previously imparted to the control program, and if the interrupted application program is different from the selected application program, the execution status of the interrupted application program is saved in a save area allotted to the program and the execution status of the selected application program is retrieved from a save area allotted to the program to shift the control of the selected application program. This feature is hereinafter called an operational feature which permits simultaneous execution of a plurality of application programs in a time interleaved mode.

In a data processing system having both the microsubroutine facility and the simultaneous execution facility of a plurality of application programs in the time interleaved mode, the acceptance of the interrupt request at a boundary of the macro instructions and the resumption from the interrupt are permitted.

However, in the prior art system, it is not possible to accept the interrupt request in the course of the execution of the microprogram. This facility is needed when a microprogram having a long execution time, such as an array operation instruction class microprogram, character string instruction class microprogram, or bit string instruction class microprogram is used. It is expected that the use of microprograms which need a long execution time and a large storage area, such as the bit string instruction microprogram, will increase in the future. This indicates that some consideration must be made to the microsubroutine facility in designing the interrupt acceptance facility. It is not desirable to accept the interrupt request only by the highest order main microprogram. In other words, it is desirable to accept the interrupt request at any point in the microsubroutine.

SUMMARY OF THE INVENTION

It is an object of the present invention to provide a data processing system capable of accepting an interrupt request and resuming the interrupted execution, in the course of the execution of a microprogram.

In order to achieve the above object, the present data processing system is characterized by means for saving and retrieving the contents of a microinstruction address register, a stack pointer and a stack area, a halfway interrupt indicating flag additionally provided in a status register, means for checking an interrupt detection signal in the course of the execution of a microinstruction, means for setting the halfway interrupt indicating flag when an interrupt request is accepted in the course of the execution of the microprogram, means for checking the halfway interrupt indicating flag when a macro instruction is decoded, and means for resuming the interrupted microprogram from the interrupted point when the halfway interrupt indicating flag is ON.

DETAILED DESCRIPTION OF THE PREFERRED EMBODIMENT

Figure 1:
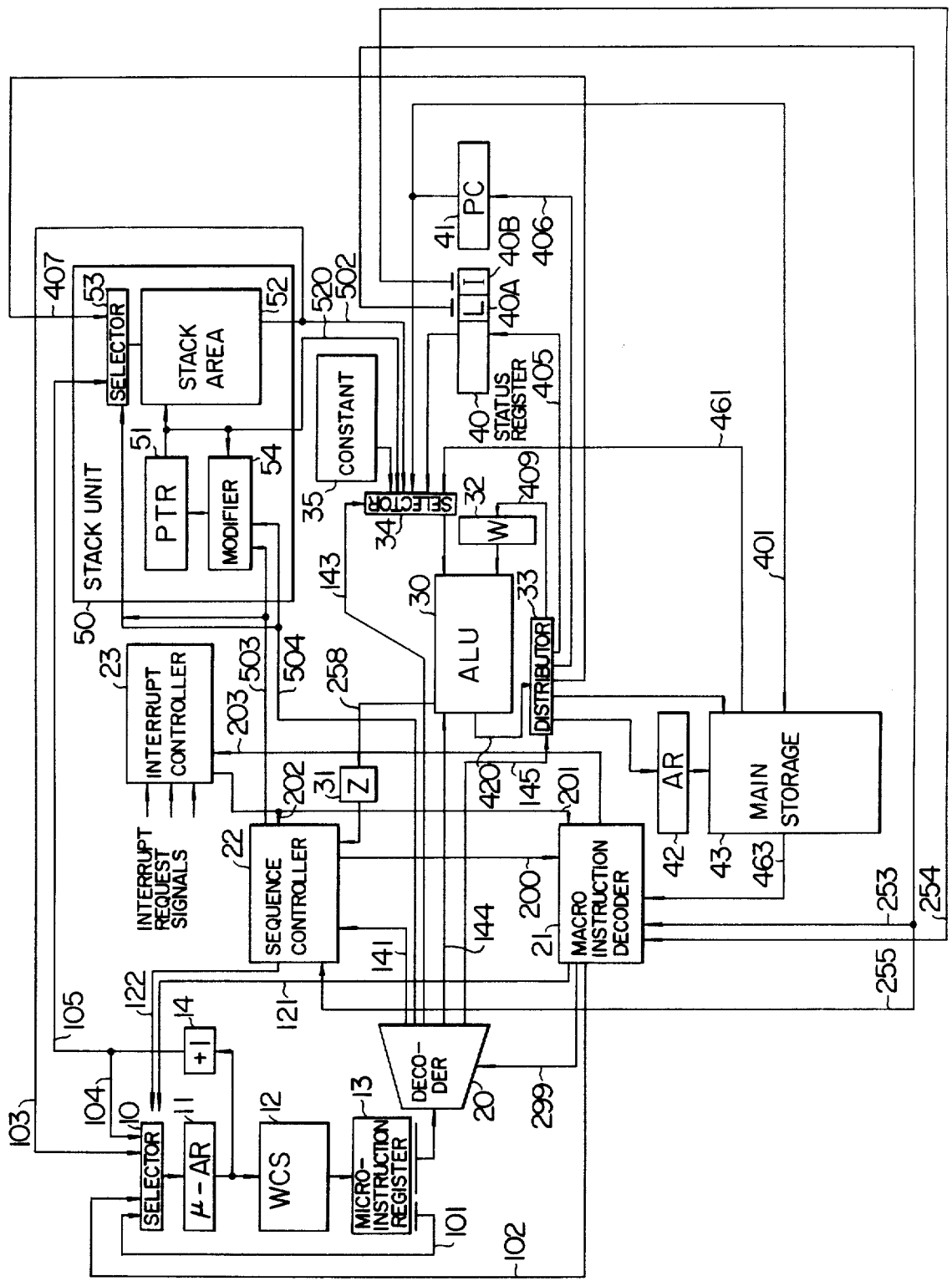
FIG. 1 shows a configuration of one embodiment of a data processing system in accordance with the present invention.

FIG. 1 shows the configuration of one embodiment of the data processing system of the present invention. In FIG. 1, numeral 11 denotes a microinstruction address register for storing therein an address of a microinstruction to be executed next, numeral 12 denotes a control storage for storing therein a microprogram, numeral 13 denotes a microinstruction register for storing therein a fetched microinstruction, numeral 14 denotes an incrementer for incrementing the microinstruction address by one, numeral 20 denotes a microinstruction decoder for decoding an operation code of the microinstruction, a numeral 22 denotes a sequence control circuit for controlling the address of the microinstruction to be executed next, numeral 21 denotes a macro instruction decoder for decoding the macro instruction, numeral 23 denotes an interrupt control circuit for monitoring interrupt request signals within the data processing system and from other units, numeral 43 denotes a main storage used to store the control program and the macro instruction chains of the application programs and same the execution status, numeral 42 denotes an address register for specifying a location address in the main storage, numeral 30 denotes an arthmetic logic unit (ALU), numeral 31 denotes a flip-flop for indicating the zero result of the operation of the ALU 30, numeral 32 denotes a work register, numeral 35 denotes a setter for setting a constant, numeral 50 denotes a stack unit, numeral 52 denotes a stack area, numeral 51 denotes a stack pointer for pointing to a storage address when a new storage request is issued to the stack area, numeral 54 denotes a stack pointer modifier, numeral 40 denotes a status register for storing the execution status of the program, numeral 40A denotes an execution level field for indicating whether the control program is being executed or the application program is being executed, numeral 40B denotes a one-bit field for indicating a halfway interrupt, numeral 41 denotes a program counter for specifying the address of the macro instruction to be executed next, numerals 10, 34 and 53 denote selectors and numeral 33 denotes a distributor.

The microsubroutine facility and the simultaneous execution facility of a plurality of application programs in the time interleaved mode will now be explained.

Figure 2:
FIG. 2 shows a division of a microinstruction by field.

The microinstruction register 13 comprises three fields as shown in FIG. 2. The content of the first field F1 is sent out to a signal line 101. The second field F2 is a sequence control order field for ordering the execution sequence of the microprogram. The content of the second field F2 is sent to the decoder 20, which decodes the sequence control order from the register 13 to send a sequence control signal to the sequence control circuit 22 through a signal line 141.

The sequence control order includes the following orders.

(1) Next address order (NEXT)

Increment the address of the currently executed microinstruction by one and set the incremented address into the microinstruction address register 11.

(2) Jump order (JUMP)

Set the address specified by the first field F1 into the microinstruction address register 11.

(3) Branch on zero order (BCZ)

When the flip-flop 31 is ON, set the address specified by the first field F1 into the microinstruction address register 11, and when the flip-flop 31 is OFF, increment the address of the currently executed microinstruction by one and set the incremented address into the microinstruction address register 11.

(4) Call order (CALL)

Increment the address of the currently executed microinstruction by one and store the incremented address in the stack area 52 through a signal line 105 and set the address specified by the first field F1 into the microinstruction address register 11.

(5) Return order (RTN)

Read a return address stored in the stack area and set it into the microinstruction address register 11 through a signal line 103.

(6) Termination order (TERM)

Send a restart signal to the macro instruction decoder 21 through a signal line 200 to start the execution of the next macro instruction.

In order to execute the sequence control orders, the sequence control circuit 22 sends a control signal to the selector 10 through a signal line 122 and sends a pushdown signal and a pop-up signal to the stack unit 50 through a signal line 503.

A third field F3 in FIG. 2 is an operation control order field for ordering an ALU operation mode of the ALU 30 and input/output signals of the ALU 30. The operation control order includes the following orders.

(1) Read order (READ)

Read information from the location of the main storage 43 specified by the address register 42 into the ALU 30 and store it in the work register 32, the status register 40, the program counter 41 or the stack area 52.

(2) Write order (WRITE)

Read information from the setter 35, the work register 32, the status register 40, the program counter 41, the stack pointer 51 or the stack area 52 into the ALU 30 and write it into the location of the main storage 43 specified by the address register 42.

(3) Move order (MOVE)

Read the contents of the setter 35 and the work register 32 into the ALU 30 and store them in the work register 32 and the address register 42.

(4) ALU operation order (ADD, SUB, AND, OR)

Carry out one of add, subtract, AND and OR operations for the content of the work register 32 and the content of the status register 40 and store the operation result in the work register 32.

(5) Updating order (INC, DEC)

Increment or decrement the content of the work register 32 by one.

In order to execute the operation control orders, the decoder 20 sends a control signal to the selector 34 through a signal line 143, sends an ALU operation mode signal to the ALU 30 through a signal line 144, sends a control signal to the distributor 33 through a signal line 145 and sends a store signal or a read signal to the stack unit 50 through a signal line 504.

If the signal on the signal line 503 or 504 is the store signal, the stack unit 50 controls the selector 53 to select the signal on the signal line 105 or 407 and controls the modifier 54 to set the signal selected by the selector 53 at the location of the stack area 52 specified by the pointer register 51 and then increments the content of the pointer register 51 by one.

If the signal on the line 503 or 504 is the read signal, the modifier 54 decrements the content of the pointer register 51 by one and then the content at the location pointed to by the pointer register 51 is read.

If the signal on the signal line 503 or 504 is a reset signal, the content of the pointer register 51 is reset to zero.

The operation where no interrupt request is issued will be first explained.

The macro instruction decoder 21 fetches the macro instruction from the location of the main storage 43 specified by the program counter 41, through a signal line 463, decodes the instruction and sends the microinstruction address corresponding to the instruction to the selector 10 through a signal line 102. It also controls the selector 10 through a signal line 121 so that the selector 10 selects the signal line 102, and as a result, the microinstruction address corresponding to the instruction is set into the microinstruction address register 11. Thereafter, a start signal is sent to the decoder 20 through a signal line 299 and the macro instruction decoder 21 stops its operation.

The decoder 20 responds to the start signal sent through the signal line 299 to start its operation. It reads out the microinstruction from the address of the control storage 12 addressed by the microinstruction address register 11 and sets it into the microinstruction register 13. Then, it decodes the operation control order specified by the third field F3 in the microinstruction register 13 and sends control signals for selecting the operation mode of the ALU 30 and the input/output signals, to the signal lines 144, 143 and 145. As a result, the operation control order specified by the third field F3 of the microinstruction register 13 is executed, and updating occurs if the content the program counter 41 etc. permits. On the other hand, the decoder 20 decodes the sequence control order specified by the second field F2 of the microinstruction register 13 and sends the sequence control signal to the sequence control circuit 22 through the signal line 141 to determine the microinstruction address to be executed next. As a result, for the sequence control order other than the TERM order, the address of the microinstruction to be executed next is set in the microinstruction address register 11 and it becomes possible to execute the next microinstruction.

For the sequence control order TERM, the sequence control circuit 22 sends the restart signal to the macro instruction decoder 21 through a signal line 200. The macro instruction decoder 21 responds to the restart signal on the signal line 200 to start the decoding of the next macro instruction.

The operation without interrupt request has thus far been described.

The manner in which the data processing system accepts the interrupt request at a boundary of the macro instructions will be now explained.

The interrupt control circuit 23 continuously monitors the interrupt request signals generated internally and externally of the data processing system, and when the interrupt request is issued, it continuously sends the interrupt detection signal to the macro instruction decoder 21 through a signal line 201.

When the macro instruction decoder 21 resumes its operation in response to the restart signal sent through the signal line 200, it first checks the interrupt detection signal sent through the signal line 201 and the information of the execution level field 40A sent through the signal line 253. If any one of them is not ON, it carries out the operation in accordance with an ordinary execution cycle of the macro instruction. If both of them are ON, it sends an interrupt acceptance signal to the interrupt control circuit 23 through a signal line 203 to reset the interrupt detection signal.

Then, it sends out a start address of an interrupt processing microprogram to the selector 10 through the signal line 102, and also sends a control signal to the selector 10 through the signal line 121 so that the selector 10 selects the signal line 102. As a result, the start address of the interrupt processing microprogram is set into to the microinstruction address register 11. Thereafter, a start signal is sent to the decoder 20 through a signal line 299 and the macro instruction decoder 21 stops its operation.

In order to save the contents of the status register (ST) 40 and the program counter (PC) 41 to the specified locations in the main storage 43 to establish a program status for the control program, the interrupt processing microprogram comprises the following microinstruction sequence.

NEXT, MOVE <ST save address> to AR
NEXT, WRITE ST
NEXT, MOVE <PC save address> to AR
NEXT, WRITE PC
NEXT, <new ST address> to ST
TERM, <new PC address> to PC where order on the left of comma is the sequence control order, order on the right of the comma is the operation control order, and the terms in the parenthesis indicate constant values.

The execution level field 40A of the newly set status register should be OFF. In response to the sequence control order TERM of the last microinstruction order, the sequence control circuit 22 sends the restart signal to the macro instruction decoder 21 through the signal line 200.

The macro instruction decoder 21 responds to the restart signal on the signal line 200 to resume the operation. It again checks the interrupt detection signal 201 and the signal on the signal line 253. Since the signal on the signal line 253 is OFF at this time, it operates in accordance with the ordinary execution cycle of the macro instruction. Thus, the control is shifted to the execution of the control program.

The shift of control to the interrupted application program is carried out by issuing from the control program a specific macro instruction (hereinafter referred to as LDPSW) for restoring the program status of the interrupted application program.

In order to restore the contents of the status register 40 and the program counter 41 saved in the specified locations on the main storage 43, the microprogram for executing the LDPSW instruction comprises the following microinstruction sequence.

NEXT, MOVE <PC save address> to AR
NEXT, READ PC
NEXT, MOVE <ST save address> to AR
TERM, READ ST In response to the sequence control order TERM of the last microinstruction, the sequence control circuit 22 sends the restart signal to the macro instruction decoder 21 through the signal line 200.

The macro instruction decoder 21 responds to the restart signal on the signal line 200 to resume the operation. Thus, the control is shifted to the interrupted application program.

As described above, the acceptance of the interruption request at the boundary of the macro instruction and the resumption of the interrupted program from the interrupt point are attained.

In the above description, the microprogram operation for calling the microsubroutine by the sequence control order CALL and the microsubroutine operation for returning to the original microprogram by the sequence control order RTN are not explained. The contents of the stack unit 50, particularly the content of the stack pointer 51 at the boundary of the macro instructions, that is, at the time when the macro instruction decoder 21 resumes the operation are also not explained.

The reason therefor is that the information stored in the stack area 52 are all invalid at the boundary of the macro instructions and the interrupt request is accepted irrespectively of the status of the stack unit 50.

In order to assure the availability of all areas of the stack area 52 in the execution of the next macro instruction, the sequence control circuit 22 may respond to the sequence control order TERM to send the reset signal to the stack unit 50 through the signal line 503 to set the stack pointer 51 to zero.

The characteristic feature of the present invention, that is, the interrupt request acceptance facility in the course of the execution of the microprogram will now be explained in detail.

In order to achieve the above facility, the embodiment shown in FIG. 1 is constructed as described below.

(1) In order to allow the content of the stack pointer 51 to be supplied to the ALU 30, a signal line 520 is provided. As a result, the content of the stack pointer 51 can be saved in the main storage 43. The number of effective store information in the stack area 52 can be checked.

(2) A signal line 202 is provided to allow the interrupt detection signal to reach the sequence control circuit 22, and a signal line 255 is provided to allow the information in the execution level field 40A to reach the sequence control circuit 22. Further, an additional sequence control order is provided additionally. The additional sequence control order (hereinafter referred to as CALLI) operates in the same manner as for the sequence control order CALL when the signals on the signal line 202 and the signal line 255 are both ON, and operates in the same manner as for the sequence control order NEXT when those signals are not ON simultaneously.

As a result, in response to the interrupt detection signal in the course of the execution of the microprogram, the program can jump to a specific address and the microinstruction address for resumption is stored in the stack area 52. Under the control of the program stored at the specific address and the following addresses, the information stored in the stack pointer 51 and the stack area 52 can be saved in the main storage 43.

(3) The one-bit field 40B (hereinafter referred to as I-flag) for indicating the halfway interrupt is provided in the program status register 40. An additional signal line 254 is provided to allow the content of the I-flag 40B to reach the macro instruction decoder 21.

As a result, it is possible to check by the macro instruction decoder 21 if the halfway interrupt has occurred in the macro instruction which is to be executed this time.

(4) When the macro instruction decoder 21 resumes operation in response to the restart signal 200 from the sequence control circuit 22, it reads in the information of the I-flag 40B through the signal line 254 prior to the instruction decode operation to check if the halfway interrupt has occurred. If the halfway interrupt is detected, it does not decode the instruction but sends a predetermined microinstruction address to the selector 10 through the signal line 102 and also sends a control signal through the signal line 121 so that the selector 10 selects the signal line 102. Then, it sends a start signal to the decoder 20 through the signal line 299 and finally stops the operation of the macro instruction decoder 21.

As a result, if the macro instruction to be executed this time has been interrupted in the course of the execution, the microprogram stored at the predetermined address and the following addresses can be executed, and under the control of that microprogram, the contents of the stack pointer 51, the stack area 52 and the microinstruction address register 11 which were saved in the main storage 43 can be restored to the status of the interrupted time point.

In this manner, the acceptance of the interrupt request in the course of the execution of the microprogram and the resumption of the execution of the interrupted microprogram can be achieved.

Figure 3:
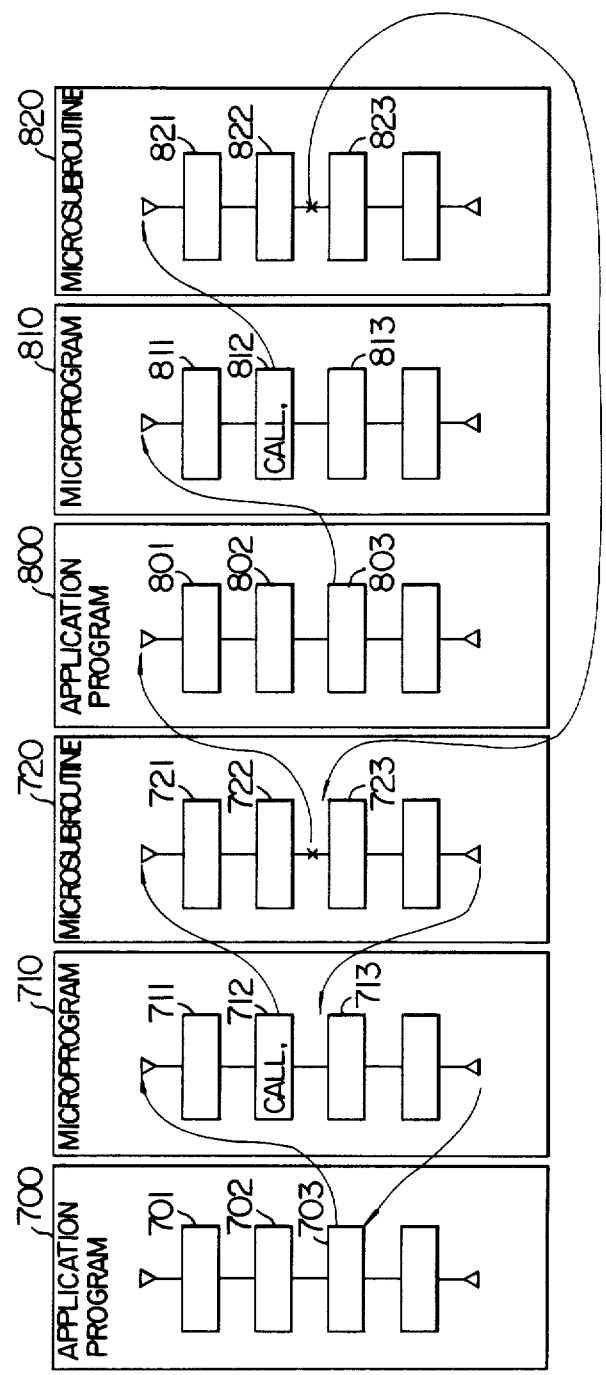
FIG. 3 shows a shift of control between application programs which is enabled by practising the present invention.

FIG. 3 shows the shift of control between the application programs which is attained by the present invention.

Referring to FIG. 3, it is assumed that an application program 700 is being executed by a macro instruction 703. A microprogram 710 for executing the macro instruction 703 executes microinstructions 711 and 712 sequentially. Under the control of the sequence control order CALL in the microinstruction 712, the control is shifted to a microsubroutine 720 and an address of a microinstruction 713 is stored in the stack area 52 and the content of the stack pointer 51 changes from "0" to "1". Then, it is also assumed that a microinstruction 721 is executed.

It is assumed that the interrupt control circuit 23 has detected an interrupt request prior to the execution of a microinstruction 722 and the sequence control order in the microinstruction 722 is the CALLI order.

The sequence control circuit 22 responds to the CALLI order to check the information on the signal lines 202 and 255. The signal on the signal line 202 is ON because of the detection of the interrupt request and the signal on the signal line 255 is ON because of the information of the execution level field 40A of the application program. Thus, as a result of the check, the same operation as for the sequence control order CALL is carried out. That is, an address of a microinstruction 723 is stored in the stack area 52, the content of the stack pointer is changed from "1" to "2" and the control is jumped to a first address determined by a jump address of the sequence control order CALLI.

After the jump to the first address, the content of the stack pointer 51 and the effective content of the stack area 52 are-saved in the main storage 43 and the content of the stack pointer 51 is changed to "0", and the information of the status register 40 with the I-flag thereof changed to ON and the content of the program counter 41 are saved in the main storage 43. Those steps are carried out by the following microprogram steps.

NEXT, MOVE <pointer save address> to AR
NEXT, MOVE PTR to W
NEXT, WRITE W
NEXT, DEC W by 1
BCZ (JADR), MOVE <area save address₁> to AR
NEXT, WRITE STACK
NEXT, DEC W by 1
BCZ (JADR), MOVE <area save address₂> to AR
NEXT, WRITE STACK
.
.
NEXT, DEC W by 1
BCZ (JADR), MOVE <area save address_N> to AR
NEXT, WRITE STACK
JADR:
NEXT, MOVE <ST save address> to AR
NEXT, MOVE ST to W
NEXT, OR <F flag set pattern>
NEXT, WRITE W
NEXT, MOVE <PC save address> to AR
NEXT, WRITE PC
NEXT, <new ST address> to ST
TERM, <new PC address> to PC Based on the sequence control order TERM in the last microinstruction, the sequence control circuit 22 sends the restart signal to the macro instruction decoder 21 through the signal line 200. In this manner, the interrupt request is accepted in the course of the execution of the macro instruction in the application program 700 and the control is shifted to the control program.

The control program stores the stack information saved in the predetermined area of the main storage 43 in an area allotted to the application program 700 and executes a final instruction LDPSW to shift the control to another application program 800. The pattern information which is newly set into the status register 40 this time complies with an initial state of the application program 800 and the address which is newly set into the program counter 41 is the start address of the application program 800. In this manner, the control is shifted to the application program 800.

It is now assumed that a macro instruction 803 in the application program 800 is being executed. A microprogram 810 for executing the macro instruction 803 executes microinstructions 811 and 812 sequentially. In response to the sequence control order CALL in the microinstruction 812, the control is shifted to a microsubroutine 820 and an address of a microinstruction 813 is stored in the stack area 52 and the control of the stack pointer 51 is changed from "0" to "1". Then, a microinstruction 821 is executed.

It is assumed that the interrupt control circuit 23 has detected the interrupt request prior to the execution of a microinstruction 822, and the sequence control order in the microinstruction 822 is the CALLI order.

The same operation as that carried out after the execution of the microinstruction 722 is carried out and finally the control is shifted to the control program.

It is assumed that the control program selects the application program 700 as the one to which the control is to be shifted next.

The control program stores the stack information relating to the application program 800 saved in the predetermined area of the main storage 43 in an area allotted to the application program 800. Then, the control program transfers the stack information relating to the application program 700 from the area allotted to the application program 700 to the predetermined area of the main storage 43, and executes the final macro instruction LDPSW to shift the control to the application program 700. The pattern information which is newly set into the status register 40 and the address which is newly set into the program counter 41 are the content of the status register 40 and the content of the program counter 41 which were saved immediately after the execution of the microinstruction 722.

In response to the sequence control order TERM in the last microinstruction of the microprogram for executing the LDPSW instruction, the sequence control circuit 22 sends the restart signal to the macro instruction decoder 21 through the signal line 200.

The macro instruction decoder 21 resumes the operation in response to the restart signal on the signal line 200. It first checks the information on the signal line 254. The signal on the signal line 254 is ON because of the I-flag 40 B in the status register 40 which relates to the application program 700 interrupted in the course of the execution of the microprogram. When the signal on the signal line 254 is ON, the macro instruction decoder 21 sends a second predetermined microinstruction address to the selector 10 through the signal line 102 and sends a control signal through the signal line 121 so that the selector 10 selects the signal line 102. Thus, the second microinstruction address is set into the microinstruction address register 11. Then, the macro instruction decoder 21 sends a start signal to the decoder 20 through the signal line 299 and finally stops the operation of the macro instruction decoder 21.

A resuming microprogram is stored at the second microinstruction address and the following addresses. The resuming microprogram restores the information of the program counter 41 and the information of the status register 40 with the I-flag 40B being changed to OFF, which informations have been saved in the main storage 43, and restores the content of the stack pointer 51 and the effective content of the stack area 52, which have been saved in the main storage 43. Those steps are carried out by the following microprogram steps.

NEXT, MOVE<PC save address>to AR
NEXT, READ PC
NEXT, MOVE<ST save address>to AR
NEXT, READ W
NEXT, AND<F flag reset pattern>
NEXT, MOVE W to ST
NEXT, MOVE<pointer save address>to AR
NEXT, READ W
NEXT, DEC W by 1
BCZ (SKIP1), DEC W by 1
BCZ (SKIP2), DEC W by 1
.
.
BCZ (SKIP$_{N-1}$), DEC W by 1
NEXT, MOVE<area save address$_N$>to AR
NEXT, READ STACK
SKIP$_{N-1}$:
   NEXT, MOVE<area save address$_{N-1}$>to AR
NEXT, READ STACK
.
.
SKIP2:
NEXT, MOVE<area save address$_2$>to AR
NEXT, READ STACK
SKIP1:
NEXT, MOVE<area save address$_1$>to AR
NEXT, READ STACK
RTN, In response to the sequence control order RTN in the last microinstruction, the sequence control circuit 22 sets the return address stored in the stack area 52, that is, an address of a microinstruction 723 into the microinstruction address register 11. In this manner, the return to the application program 700 is completed.

It should be understood that the application program 800 can be resumed.

As described hereinabove, according to the present invention, in the data processing system which simultaneously executes a plurality of independent application programs in the time interleaved mode, the acceptance of the interrupt request in the course of the execution of the microprogram and the resumption of the interrupted microprogram are achieved.

While the contents of the stack pointer 51 and the stack area 52 are saved in the main storage 43 in the illustrated embodiment, they may be saved in a separate storage.

What is claimed is:

1. A data processing system having an improved microsubroutine facility comprising:
first storage means for storing therein macro instructions;
means including a program counter coupled to said first storage means for supplying an address of a macro instruction next ot be executed to said first storage means;
second storage means for storing therein micro-programs for executing said macro instructions;
means including an address register coupled to said second storage means for supplying an instruction address of a microprogram next to be executed to said second storage means;
stack means for storing therein a return address of the microprogram;
first means responsive to a first microinstruction, which instructs a microsubroutine call, for storing the return address of the microinstruction in said stack means, and responsive to a second microinstruction, which instructs a return from the microsubroutine, for returning the return address of the microinstruction from said stack means;
mode indication means for indicating whether the execution mode of said macro instruction is a control program mode or an application program mode;
means including a status register for indicating the operation status of a macro instruction being executed;
interrupt control means for monitirong an interrupt request;

second means for determining acceptance or non-acceptance of the interrupt request on the basis of said mode indication means including means for setting into said address register a microinstruction address for executing the macro instruction specified by said program counter, when an interrupt request is not accepted, and for storing the contends of said status register, the indication of the program mode, and the contents of said program counter, when the interrupt request is accepted, and means for setting pattern information which corresponds to the execution mode after the interrupt into said status register and said program counter and thereafter setting the microinstruction address specified by said program counter into said address register, thereby restoring the information stored at the time of an interrupt to said status register and said program counter;

third storage means for storing therein the contends of said stack means;

means including a halfway interrupt indicating field for indicating that an interrupt request was accepted in the course of the execution of a macro instruction; and third means responsive to an interrupt request detection signal from said interrupt control circuit for setting the halfway interrupt indicating field to an interrupt indicating state, when an interrupt request is accepted, and for saving the contents of said stack means, the contents of said status register, the indication of the program mode, and the contents of said program counter, in the course of the execution of the application program mode, and means for setting said halfway interrupt indicating field to a non-interrupt indicating state and for restoring the contends of said stack means after completion of the execution of the interrupt program.

2. A system according to claim 1, wherein said stack means includes a stack area and stack pointer.

3. A system according to claim 1, wherein said means for indicating said program mode and said means for indicating halfway interrupt are included in said status register.

4. A system according to claim 1, wherein said second means for determining acceptance or non-acceptance of the interrupt request is coupled with said interrupt control circuit and said first storage means, and includes means for checking the interrupt request detection signal supplied from said interrupt control circuit and said means for discriminating whether the execution mode of said macro instruction is a control program mode or an application program mode at the boundary of the execution of the macro instruction.

* * * * *